Oct. 6, 1959     G. H. BUSHWAY     2,907,264
CORN POPPING MACHINE

Filed Dec. 27, 1956     5 Sheets-Sheet 1

Inventor:
George H. Bushway,
by Kinney, Jenney, Witter & Hildreth
Attorneys

Oct. 6, 1959
G. H. BUSHWAY
2,907,264
CORN POPPING MACHINE
Filed Dec. 27, 1956
5 Sheets-Sheet 2
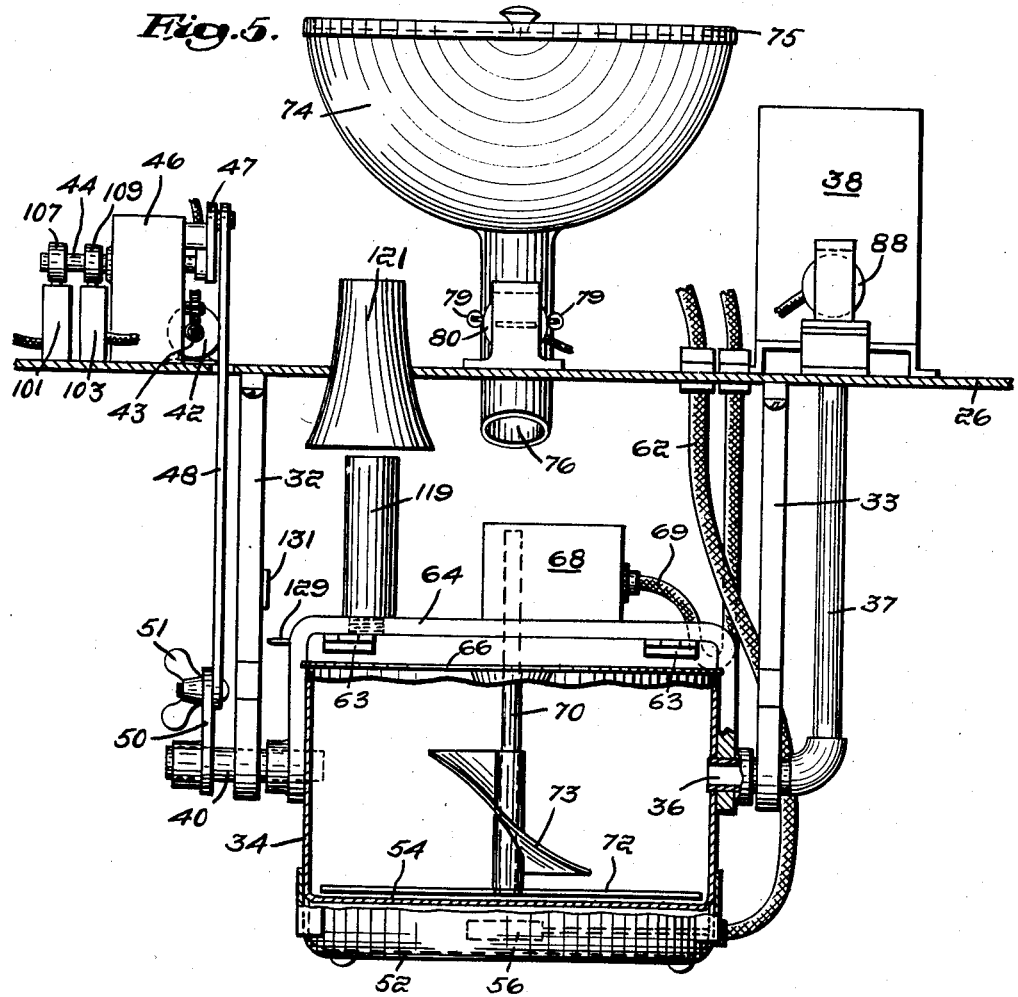
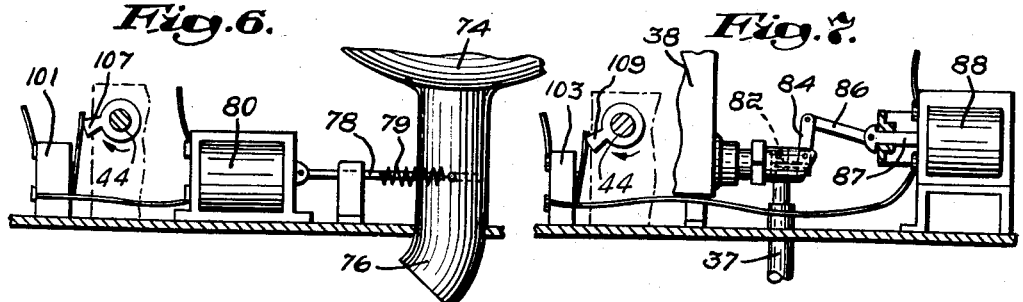
Inventor:
George H. Bushway,
by Kenway, Jenney, Witter & Hildreth
Attorneys

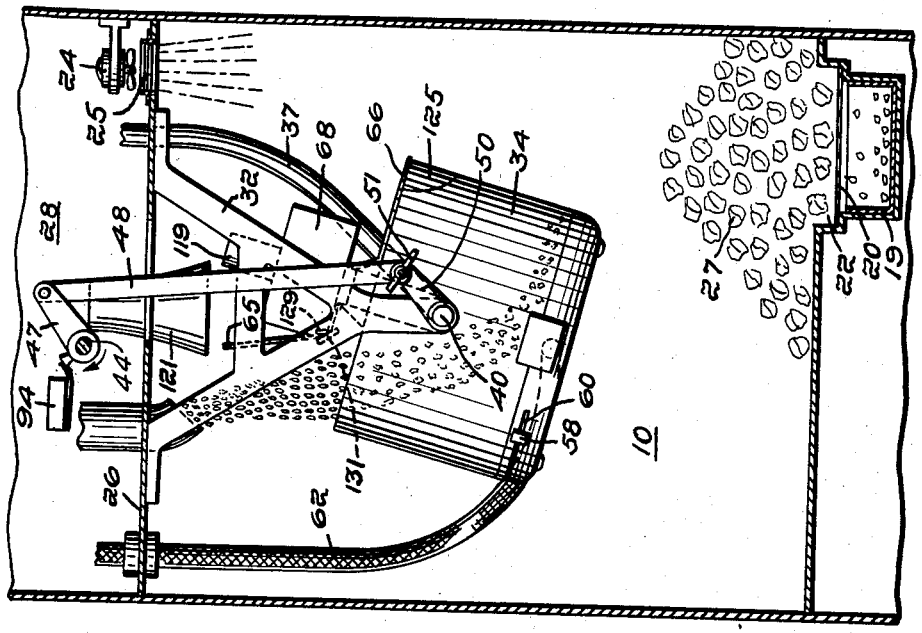

Oct. 6, 1959 G. H. BUSHWAY 2,907,264
CORN POPPING MACHINE
Filed Dec. 27, 1956 5 Sheets-Sheet 4

Inventor:
George H. Bushway
By Kenway, Jenney, Witter & Hildreth
Attorneys

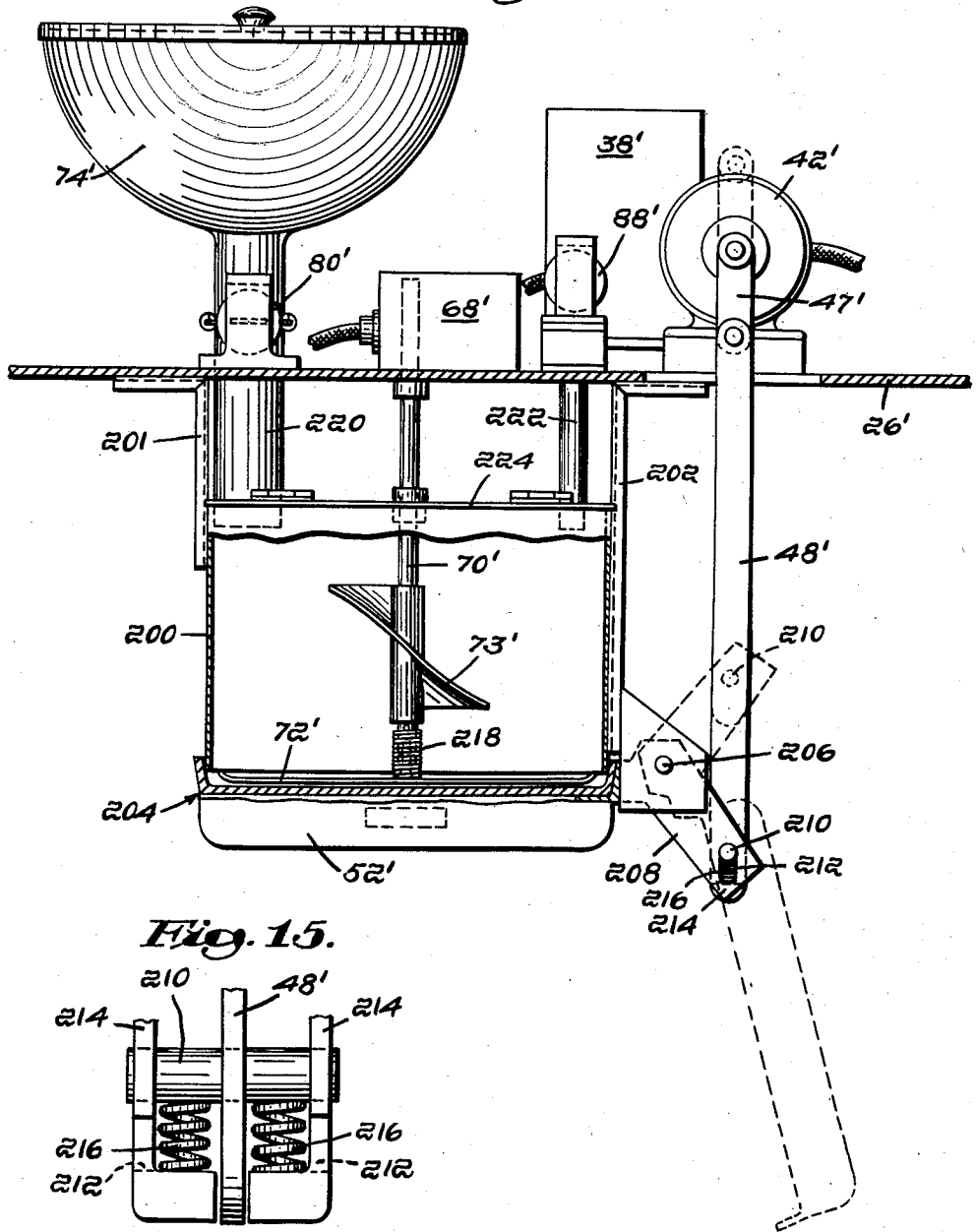

United States Patent Office 2,907,264
Patented Oct. 6, 1959

2,907,264

CORN POPPING MACHINE

George H. Bushway, Rye Beach, N.H.

Application December 27, 1956, Serial No. 630,943

9 Claims. (Cl. 99—238.3)

This invention relates to corn popping machines and more particularly to a fully automatic machine adapted to pop and discharge successive batches of corn without requiring any manual operation or control. The machine includes a popping kettle, a supply hopper for unpopped corn and a supply tank for cooking oil, electric heating means and means for automatically controlling the operation of the machine through repeated cycles each embodying the discharging into the kettle of a measured quantity of corn from the hopper and a measured quantity of oil from the tank, the popping of the corn in the kettle, and the discharging of the corn when popped, all without the intervention of manual attention or aid. The production of a novel machine of this nature and for the purpose described comprises the primary object of the invention.

Machines of this nature are ordinarily located in stores and like public places frequented by large numbers of potential customers and are attended by unskilled clerks or the like. Machines which are semi-automatic or require any manual aid or attention frequently result in objectionable difficulties and delays in operation due to the operator's negligence or failure. These objections are wholly eliminated in my machine since the operator is required only to keep the hopper and tank supplied with corn and cooking oil and to serve the popped corn to customers as required. The production of a machine of this nature which will thus reduce to a minimum the manual operations required and substantially free the attendant for the performing of other duties comprises a further object of the invention.

These and other features of the invention will be best understood and appreciated from the following description of a preferred embodiment thereof selected for purposes of illustration and shown in the accompanying drawings in which—

Fig. 1 is a front elevation of a popcorn dispensing cabinet incorporating the invention therein, Fig. 2 is a side elevation thereof, Fig. 3 is a bottom plan view showing the heating and thermostatic controlling means for the popping kettle, Fig. 4 is a fragmentary front view showing the kettle and cover, Fig. 5 is a front elevation of the machine, partly broken away, Fig. 6 is a fragmentary view of mechanism for discharging batches of unpopped corn into the kettle, Fig. 7 is a fragmentary view of mechanism for discharging a measured quantity of cooking oil into the kettle, Fig. 8 is a side elevation showing the discharging of a batch of popped corn from the kettle, Fig. 9 is a like view showing the discharging of unpopped corn into the kettle from the hopper.

Fig. 14 illustrates a modified form of the invention, and Fig. 15 is a fragmentary elevation of parts shown in Fig. 14.

Figure 1:
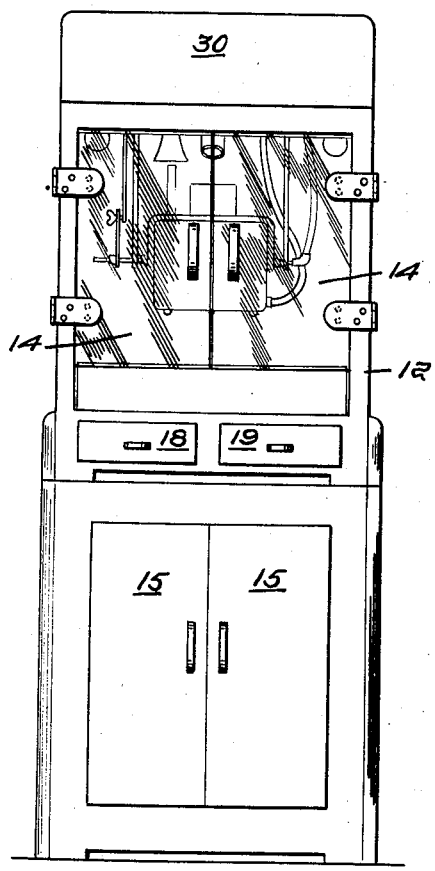
Figure 2:
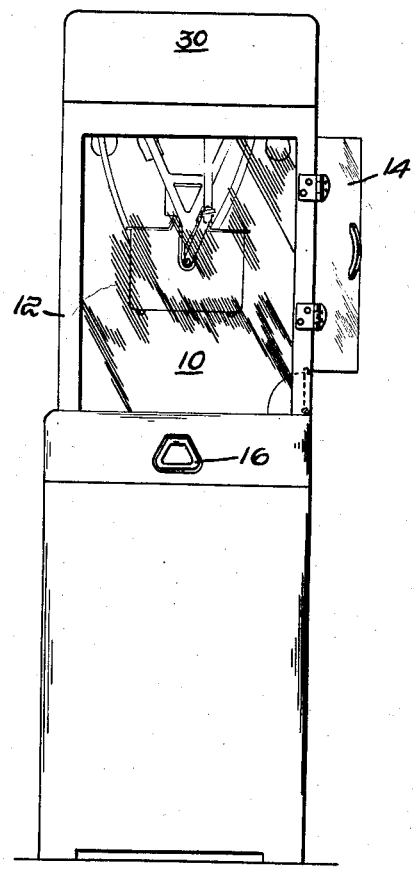
Figure 3:
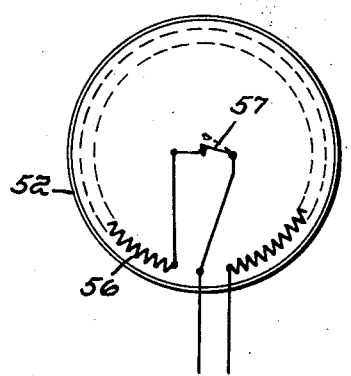

In Figs. 1 and 2 of the drawings I have illustrated the corn popping machine as housed within the upper chamber 10 of a corn dispensing cabinet 12. The chamber 10 also serves as a storage bin for the popped corn, the chamber walls, including two pivoted doors 14 at the front of the chamber, being transparent to expose both the machine and popped corn to full view. A storage chamber with doors 15 is provided beneath the upper chamber 10 and the latter preferably embodies a removable top section having lifting handles 16. Two drawers 18 and 19 are also provided in the top section, one of the drawers being disposed beneath a screen 20 in a well 22 as illustrated in Figs. 8 and 9. The screen is of a mesh size to permit hard and unpopped kernels to pass therethrough into the drawer 10 therebeneath. A fan 24 is disposed above an electric heating unit 25 for blowing heated air onto the popped corn 27.

The machine is supported on a ceiling partition 26 of the chamber 10 which also provides a further chamber 28 thereabove for housing mechanism hereinafter described, a removable cover 30 being disposed over the chamber 28.

Two spaced brackets 32 and 33 are hung from the ceiling 26 and the corn popping kettle 34 is mounted for pivotal movement on and between these brackets at their bottom ends. At the bracket 33 the kettle is pivotally mounted on the horizontally extending end 36 of a pipe 37 from a cooking oil tank 38. A trunnion 40 fixed to the opposite side of the kettle in alignment with the pipe 36 extends through and is supported on the bracket 32. The kettle is adapted to be pivoted to the positions illustrated in Figs. 8 and 9 by a motor 42 and mechanism hereinafter described.

The motor 42 functions through reduction gearing, including a worm 43 on the motor shaft, to drive a shaft 44 mounted in a gear box 46. Fixed to the shaft 44 is a crank 47 connected by a link 48 to a crank 50 on the trunnion 40. The cranks 47 and 50 together with the link 48 provide a continuous driving connection from the gear box 46 to the kettle and the arrangement is such that one rotation of the shaft 44 will pivot the kettle 34 from the corn popping position of Fig. 10 to the discharging position of Fig. 8 and return. A wing nut 51 provides for disconnecting the link if it is desired to pivot the kettle manually to any position.

A housing 52 is affixed to the bottom portion of the kettle and provides a chamber therein beneath the kettle bottom 54. Disposed annularly within the housing is an electric heating coil 56, and within the coil and arranged closely adjacent to the bottom 54 of the kettle to be influenced by the temperature of the bottom wall and the product in the kettle is a thermostat controlling unit including a thermostatic switch 57. The thermostatic switch is normally in closed circuit position and is adapted to open when the kettle bottom and product are heated to a predetermined temperature. The thermostat unit is standard equipment and no novelty is claimed therefor per se. The predetermined temperature setting can be varied by adjusting an arm 58 extending outwardly through a slot 60 in the housing 52. A flexible cable 62 provides proper electrical connections to the heater and thermostat.

Figure 12:
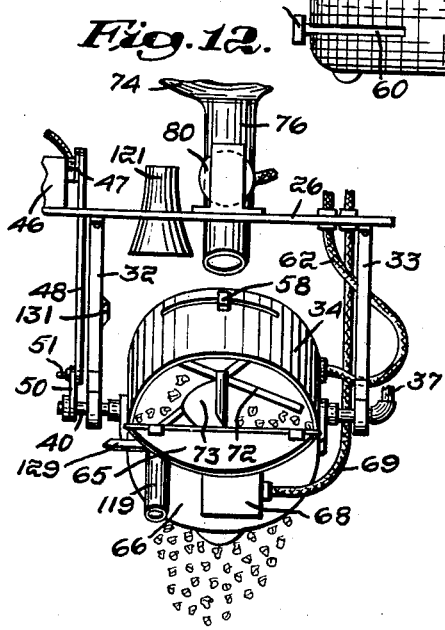
Fig. 12 is a fragmentary front elevation showing the kettle discharging a batch of popped corn.

An inverted U-shaped yoke 64 embraces the kettle diametrically thereof and has its two legs secured to opposite sides of the kettle at the pivot axis as illustraed in Fig. 5. Pivoted to opposite sides of the yoke by hinges 63 are two segmental cover lids 65 and 66 adapted with the yoke to cover the top of the kettle when the lids are in closed position. Also mounted on the yoke is an electric motor 68 having a cable connection 69. A shaft 70 extends vertically downward through the yoke from the motor centrally and to the bottom of the kettle. Radial corn stirring fingers 72 (Fig. 12) are carried by the shaft closely adjacent to the kettle bottom and a spirally disposed blade 73 is mounted on the shaft above the fingers for stirring and lifting the popped corn upwardly away from the fingers 72 and the unpopped corn.

Mounted on the partition 26 and within the chamber 28 is a hopper 74 for holding a supply of unpopped corn. The hopper has a cover 75 and its bottom end includes a tubular channel 76 for directing corn downwardly into the kettle. A sliding gate 78 held in a closed position by a spring 79 (Fig. 10) normally closes the channel 76. The gate is connected to the core of a solenoid 80 which when energized functions to withdraw the gate and permit a charge of corn to flow downwardly into the kettle.

Also mounted on the partition 26 and within the chamber 28 is the tank 38 for holding a supply of cooking oil. The pipe 37 is connected to the bottom of the tank through a normally closed valve 82. A lever 84 pivoted to the valve is connected by a link 86 to the core 87 of a solenoid 88. When the solenoid is energized the core is withdrawn and operates the lever to open the valve and permit a charge of oil to pass downwardly into the kettle.

Figure 13:
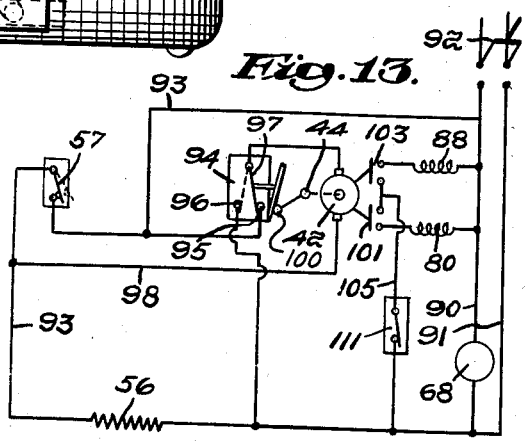
Fig. 13 is a wiring diagram of the electric connections.

The machine is operated under the control of the electric circuit shown in Fig. 13 in which the line wires 90 and 91 are adapted to be closed into the power circuit by a main switch 92. The corn stirring motor 68 is in the circuit 90. The heating coil 56 and thermostatic switch 57 are in series circuit with the wires 90 and 91 through a line 93. Cooperating with the thermostatic switch 57 is an auxiliary microswitch 94. In Fig. 13 I have illustrated this switch as embodying a contact 95 connected to the line 90 through the line 93 and a contact 96 connected to the line 91. A pivoted switch bar 97 connected to one terminal of the motor 42 is normally held against the contact 95. A wire 98 connects the other terminal of the motor to the wire 93. A cam 100 on the shaft 44 (Figs. 8 and 9) is adapted to pivot the bar 97 to the contact 96 during each cycle rotation of the shaft as and for the purpose hereinafter described.

The solenoids 80 and 88 are indicated graphically in Fig. 13 as comprising coils connected to the line 90 and to normally open switches 101 and 103, the cooperating terminals of the switches being connected by a wire 105 to the line 91. The switches 101 and 103 are adapted to be closed by the cams 107 and 109 on the shaft 44 (Fig. 5) during each cycle rotation of the shaft as and for the purpose hereinafter described.

Figure 10:
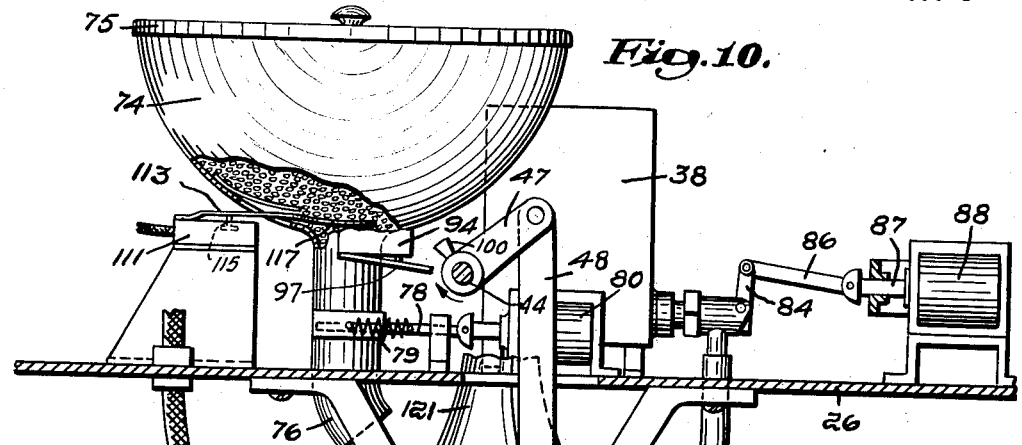
Fig. 10 is a side elevation showing the kettle in corn popping position.
Figure 11:
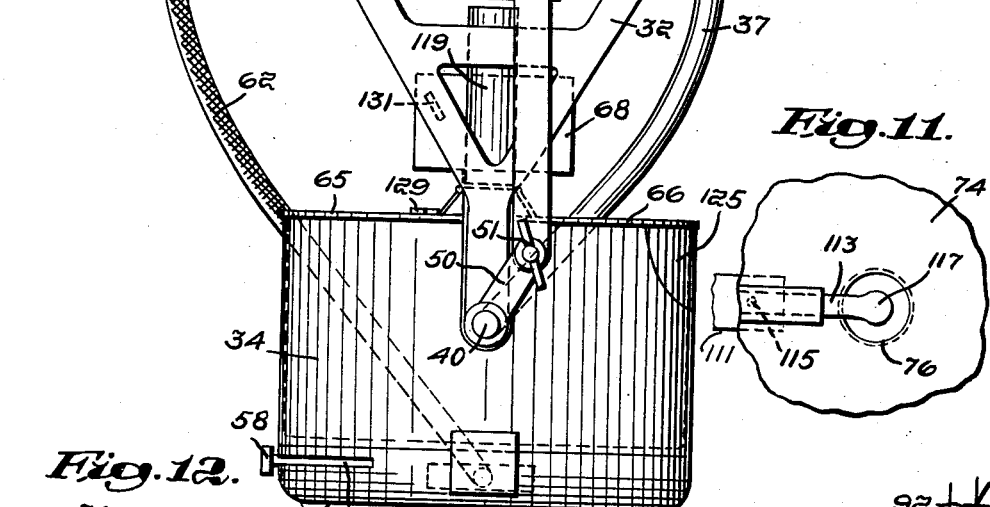
Fig. 11 is a fragmentary plan view of the corn hopper.

A safety switch mechanism is provided in the corn hopper 74 for preventing the discharging of corn and cooking oil into the kettle when the supply of corn in the hopper is substantially depleted. This mechanism comprises a normally open switch 111 in the line 105 (Figs. 10 and 13). A spring arm 113 carried on the switch body extends therefrom over the switch closing element 115 and into the bottom of the hopper (Fig. 11). A pan 117 on the free end of the arm is disposed above the mouth of the channel 76 in position permitting corn to pass thereover and into the channel. The weight of the corn on the pan normally depresses the arm and holds the switch closed. When the corn in the hopper is depleted to a predetermined weight on the pan the arm rises and permits the switch to open, thus breaking the circuit to the solenoids 80 and 88.

Figure 4:
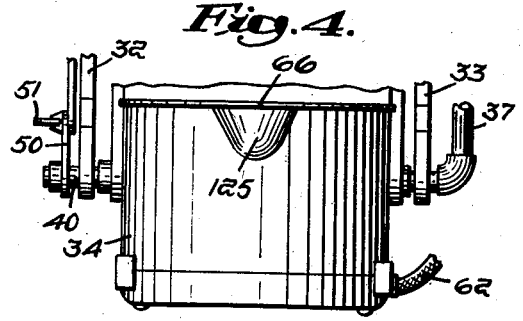

A pipe 119 for venting fumes from the kettle may be mounted on the yoke 64 and a funnel-like filter 121 disposed thereabove is adapted to receive and neutralize the fumes. As illustrated in Figs. 4 and 8, the front side wall of the kettle is recessed downwardly from its top rim at 123 to facilitate dumping of the popped corn therefrom and the cover lid 66 pivoted to the kettle has a lip 125 disposed to close the recess when the lid is in closed position on the kettle.

The operation of the machine is substantially as follows, it being assumed that a supply of unpopped corn is in the hopper 74 and a supply of cooking oil is in the tank 38. The parts, including the electric circuit, are shown in normal position in Figs. 10 and 13 in which position the circuit is closed through the heater 56 and thermostatic switch 57, the motor 42 being short circuited by the closed switch 57. Upon closing the main switch 92, the heater is energized to heat the bottom 54 of the kettle 34. When this heat reaches a predetermined maximum the thermostatic switch 57 automatically opens, thus cutting out the heater in the circuit and energizing the motor 42 through the contact 95, switch bar 97, motor 42 and heater 56 to the line 91. The motor thereupon rotates the shaft 44 in the direction of the arrow (Fig. 10) from the position of Fig. 10 to the popped corn dumping position of Fig. 8 and to the position of Fig. 9 at which last position the motor is stopped by the cam 100 pivoting of the switch bar 97 to the position shown in Fig. 9 and in broken line in Fig. 13. In this position both the heater and motor are idle.

When the kettle approaches the position of Fig. 8 the lids 65 and 66 automatically open by gravity and as the kettle approaches the position of Fig. 9 the cams 107 and 109 momentarily close the switches 101 and 103. The solenoids 80 and 88 thereupon open the gate 78 and valve 82 for a time period sufficient to discharge a predetermined amount of unpopped corn and cooking oil into the kettle. To facilitate the discharging of the corn into the kettle, as illustrated in Fig. 9, the lid 65 is held open in such position by an arm 129 thereon coming into light frictional contact with a plate 131 on the bracket 32 (Fig. 5).

The discharging of the corn and oil into the kettle hastens the cooling of the kettle bottom 54 to a point at which the thermostatic switch 57 closes. When such switch closes both the heater 56 and motor 42 are energized and the motor moves the shaft 44 forwardly to the position of Fig. 10 wherein the motor stops when advancing of the cam 100 permits movement of the switch bar 97 to the contact 95. The heater continues to function to pop the corn in the kettle. The popping of the corn requires a continuing additional amount of heat and when the popping is completed the bottom of the kettle automatically reaches the predetermined temperature at which the thermostat 57 opens. The machine again thereupon automatically functions through its cycle to discharge the popped corn, take on a new batch of corn and cooking oil, and pop the corn as already described.

In Fig. 14 I have illustrated a modified construction in which the kettle comprises independent but cooperating bottom and side wall units, the parts corresponding to Figs. 1–13 being indicated by like reference characters primed. The kettle side wall unit 200 is supported by brackets 201 and 202 on and depending from the partition 26'. The bottom unit 204 of the kettle is pivoted to the bracket 202 at 206 and carries a fixed arm 208. The free end of the arm is of U-shape construction as shown in Fig. 15 and receives thereinto and downwardly therethrough the lower end of a link 48'. The link is connected to a crank 47' on a shaft 44' driven through reduction gearing (not shown) from a motor 42' in the manner of shaft 44 previously described.

A pin 210 carried by the link 48' extends outwardly at both ends through slots 212 in the side walls 214 of the arm 208. Compression springs 216 in the arm beneath the pin normally maintain the pin at the top ends of the slots and serve resiliently to maintain the bottom wall unit 204 in the closed position of Fig. 14. Movement of the link upwardly to the broken line position pivots the bottom wall downwardly to the position illustrated in broken lines. The mounting of the fingers 72' on the bottom end of the shaft 70' includes a compression spring 218 disposed to cushion the closing of the unit 204.

The corn from the hopper 74' is fed into the kettle through a tube 220 extending thereinto. Cooking oil from the reservoir 38' is fed into the kettle through a tube 222. Pivoted doors 224 are provided at the top of the kettle to permit the escape of popped corn when the kettle becomes full to overflowing. It will be apparent that this modified construction simplifies the mounting of the kettle and cooperating parts and furthermore very substantially facilitates the cleaning of the kettle and especially the bottom wall.

The operation of this machine is substantially as described in relation to the machine shown in Figs. 1–13. The kettle is illustrated in corn popping position in Fig. 14. When the temperature at the bottom wall reaches the predetermined maximum the thermostatic switch automatically opens and the motor 42' thereupon moves the link 48' and the botttom wall unit 204 to the corn dumping position shown in broken lines in Fig. 14, and the motor continues its operation to a position corresponding to Fig. 9. In this last position the bottom wall unit has been returned to closed position and charges of corn and cooking oil have been automatically deposited into the kettle. When the kettle bottom cools to a point closing the thermostatic switch, the motor 42' functions to move the parts to the full line position of Fig. 14 whereupon the auxiliary switch at 94 functions to stop the motor and leave the heater in corn popping position. The resilient action of the compression springs 216 permits this last operation of the motor even though the bottom wall unit 204 is in closed position. The cycle of operations are thereafter automatically repeated.

The cable 62 to the heater and thermostat unit in both forms of the invention preferably is removably plugged into the kettle bottom and can be removed when the kettle is being cleaned. Also the bottom unit 204 is preferably mounted at 206 for convenient removal so that it can be immersed and washed in a cleaning solution.

It should be understood that each operation cycle is under the control of the normally closed thermostatic switch 57 which in turn is influenced in its operation by the temperature of the bottom wall of the kettle. Also this temperature is influenced by the batch of corn and oil deposited into the kettle. It will be apparent that when a batch of corn and oil is thus deposited the temperature of the bottom wall is lowered and the time required to bring the temperature up to a point sufficiently high to open the switch 57 varies with the quantity of corn and oil in the batch. Thus the load quantity in the batch determines the length of the cooking cycle and renders the machine automatic even with varying loads. It should be understood that the thermostat is set to open the switch 57 when the temperature reached is sufficient to have accomplished the popping function.

The machine is fully automatic and requires the operator only to keep the hopper and reservoir supplied with corn and oil. Thus the operator is relieved of all duties relating to the popping function and is free to devote his entire time to the serving of customers. Furthermore, due to the automatic functioning of the machine, the corn is fully and uniformly popped regardless of the batch load, little or no hard and unpopped kernels are produced and the final product is light and fully expanded corn adapted to produce a maximum number of bags to the pound.

Having thus disclosed my invention what I claim as new and desire to secure by Letters Patent is:

1. A corn popping machine comprising a kettle having bottom and side walls, means mounting certain of said walls for pivotal movement about a horizontal axis to and from a corn popping position and a corn dumping position, an electric heater beneath and adjacent to the bottom wall of the kettle, an electric motor, driving connections from the motor for effecting said pivotal movement of said certain walls through a cycle from said corn popping position to said corn dumping position and return, a hopper for holding a supply of unpopped corn, a tank for holding a supply of cooking oil, means operative through a portion of said driving connections to discharge a measured quantity of corn from the hopper and a measured quantity of oil from the tank into the kettle upon the return of said certain walls from the corn dumping position, a thermostat arranged to be influenced by the temperature of the bottom wall and the product in the kettle, and mechanism including a switch under the control of the thermostat for causing the motor and said driving connections to effect said cycle of operations when said temperature is raised to a predetermined point.

2. The corn popping machine defined in claim 1 in which said driving connections include a shaft and reduction gearing for rotating the shaft from the motor, and in which the second named means includes solenoids under the control of the shaft for effecting said discharging of corn and oil into the kettle.

3. The corn popping machine defined in claim 1 in which said driving connections include a shaft, a crank on the shaft, a crank fixed to move with said pivotally mounted certain walls of the kettle about said axis and a link connecting the free ends of the cranks.

4. The corn popping machine defined in claim 1 in which the second named means includes an electric circuit for effecting said corn and oil discharging operations, a normally open switch disposed in the circuit and normally operative to discontinue said operations, and means including a corn supporting pan at the bottom of the hopper for holding the switch in closed position when corn of a predetermined weight is supported on the pan.

5. The corn popping machine defined in claim 1 plus a shaft disposed axially within the kettle and having a plurality of corn stirring spaced arms radiating from its bottom end at the bottom of the kettle, means including an electric motor for rotating the shaft, and a spiral-like plate carried by and radiating outwardly from the shaft above said arms for lifting popped corn during the popping operation.

6. A corn popping machine comprising a kettle, means supporting the kettle for pivotal movement about a horizontal axis to and from upright corn popping position and inverted corn dumping position, an electric heater beneath and adjacent to the bottom wall of the kettle, an electric motor, driving connections from the motor for pivoting the kettle through a cycle from said upright position to inverted position and back to upright position, a hopper for holding a supply of unpopped corn, a tank for holding a supply of cooking oil, means operative through a portion of said driving connections to discharge a measured quantity of corn from the hopper and a measured quantity of oil from the tank into the kettle upon its return from inverted corn dumping position, a thermostat arranged to be influenced by the temperature of the bottom and the product in the kettle, and mechanism including a switch under the control of the thermostat for causing the motor and said driving connections to pivot the kettle through said cycle when said temperature is raised to a predetermined point.

7. The corn popping machine defined in claim 6 plus means including a conduit disposed along the pivot axis of the kettle for delivering said oil to the kettle.

8. The corn popping machine defined in claim 6 in which the side wall of the kettle is recessed downwardly from its top rim to facilitate dumping of the popped corn therefrom, and a cover pivoted to the kettle and having a lip disposed to close the recess when the cover is in closed position on the kettle.

9. The corn popping machine defined in claim 6 plus a cover mounted on one side of the kettle for pivotal movement about an axis parallel with and disposed at one side of a diameter extending across the kettle, a second cover mounted on the other side of the kettle for pivotal movement about an axis parallel with and disposed at the other side of the said diameter, and abutment means for engaging and retaining the second cover in open position during a portion of the return pivotal movement of the kettle to upright position.

References Cited in the file of this patent

UNITED STATES PATENTS

| | | |
|---|---|---|
| 2,027,698 | Parks et al. | Jan. 14, 1936 |
| 2,147,478 | Barnard | Feb. 14, 1939 |
| 2,771,836 | Denehie et al. | Nov. 27, 1956 |